Patented June 20, 1939

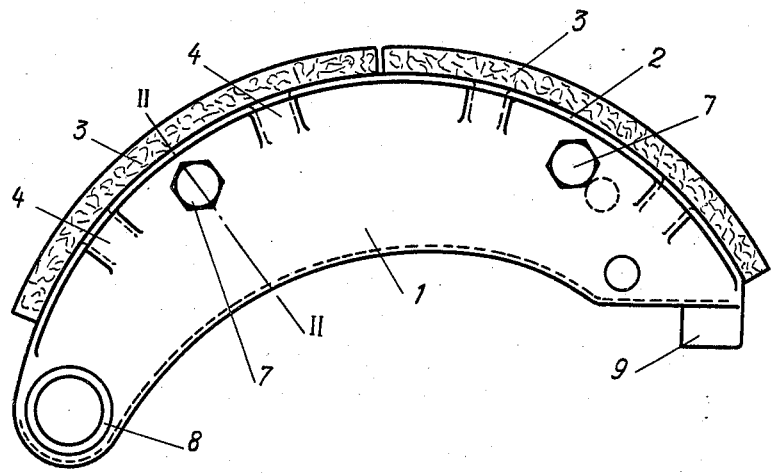
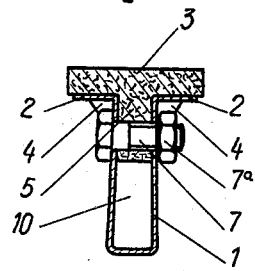
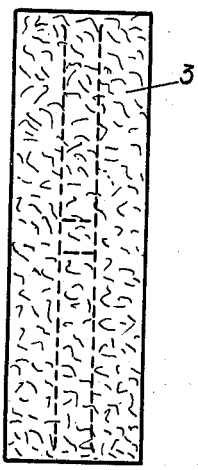
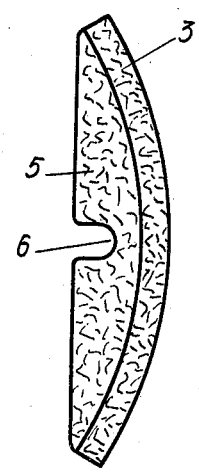
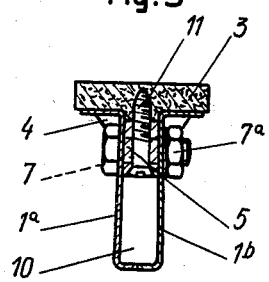

2,163,143

UNITED STATES PATENT OFFICE 2,163,143

BRAKE SHOE

Giuseppe Gallo, Giovanni Battista Bassi, Felice Bassi, Luigi Bassi, and Giuseppe Calliera, Turin, Italy Application September 21, 1937, Serial No. 164,862
In Italy December 3, 1936

2 Claims. (Cl. 188—246)

This invention has for its object a brake shoe, more particularly for motor vehicle brakes, in which the brake lining is attached in an easily removable manner.

Heretofore brake linings were generally nailed to the brake shoe body and replacement of the worn lining could not be effected on the road but had to be carried out in the workshop, for it necessitated removal of the brake shoes and detachment of the nailed connection.

An object of this invention is to provide an improved attachment of brake linings, in which the linings are fitted by means of ribs in U-shaped openings in the brake shoe bodies and secured therein in an easily detachable manner, for instance by means of bolts extending transsersely through the openings and pressing the walls of the opening against the ribs when they are tightened. In this case, the linings may be removed simply by loosening the bolts, and replaced without necessitating detachment of the brake shoes or other complicated operations.

The lining is conveniently made of T-shaped section and its rib fits in a groove extending in the longitudinal direction of the brake shoe body and having resilient walls that can be clamped against the rib by tightening the bolts and move away therefrom by virtue of their elasticity when the bolts are loosened. The latter operation permits of removing the lining with its rib without any effort.

The bolt is conveniently situated at half-length of the lining. For a safe attachment of the lining it has been found sufficient to provide a suitable clamping surface only in proximity of the bolt. Consequently, the lower edge of the rib can be cut approximately along the chord of the arc of the lining, which affords a greater economy in material than if the rib also were segment-shaped.

The drawing shows diagrammatically a construction of the object of this invention.

Figure 1 is aside view of a complete brake shoe for an internal-expanding brake, which is provided in this case with two brake linings.

Figure 2 is a cross section on line II—II of Figure 1.

Figure 3 is a top view and

Figure 4 is a side view of a brake lining.

Figure 5 shows another construction of the brake shoe body.

1 denotes the brake shoe body which is U-shaped in cross section and is made conveniently from pressed sheet metal. The body 1 is formed at its outer curved edge with flanges 2 on which rests the head portion 3 of the lining segments of T-shaped cross section. The supporting capacity of the flange 2 is improved by reinforcing ridges 4.

The rib 5 of the segments is inserted in the recess 10 formed by the U-shaped bend of the brake shoe body. The lower edge of the rib 5 extends as will be seen from Figure 4, along the chord of the lining arc and is formed in its central portion with a recess 6 open below, through which extends the clamp bolt 7 fitted in axially aligned holes in the shoe branches. The shoe branches are slightly resilient and in order to improve the removal and insertion of the lining they are made in such manner that when the nut 7a is loosened they recede from the sides of the rib 5, against which they are pressed on tightening of the nut 7a. To replace the lining it will be sufficient to screw back the nut 7a, whereupon the lining can be removed without necessitating removal of the bolt 7. The fresh lining is then fitted in position and secured by tightening the nut 7a. The shoe is completed by the bush 8 for the pivot of rotation of the shoe and block 9, on which acts the usual cam (not shown) of the brake mechanism. Instead of being made from pressed sheet metal, the brake shoe may be of other material, for instance cast or forged, provided this is sufficiently resilient to enable the side walls of the shoe body to be clamped against the rib 5 and to recede automatically from the rib on the bolt being loosened.

According to Figure 5 the brake shoe body is made of two portions 1a, 1b, held together by the bolts 7 and, if desired, by the block 9. The head portion 3 of the lining and the adjacent portion of the rib 5 form a piece separate from the other rib portion. The latter which may be of metallic construction has secured thereto screw-threaded bolts 11 screwed into the former portion. In this manner it is possible to make only the portion of the lining subjected to wear of friction material, while the other portion can be made of cheaper material. As both portions are easily separable from each other, it is possible to apply fresh friction material to the portion not subjected to wear, in order to re-utilize it.

It will be advisable to employ as friction material a conglomerate of asbestos fibers, that may be made even of short asbestos fibre, which is otherwise unsuitable for the usual fabrics and threads employed as brake linings.

It will be obvious that the form and constructional details of the brake shoe body and lining segments can be varied in accordance with practical requirements without departing from the spirit of this invention.

What we claim is:

1. A brake shoe for motor vehicle brakes and the like comprising in combination, a shoe body of U-section, a lining in said body formed with an open recess and a bolt extending through holes in the walls of the shoe and through the recess in the lining and pressing the side walls of the shoe body against the lining so that the lining is retained between said walls by friction.

2. The brake shoe of claim 1, in which the shoe body consists of a U-shaped piece of resilient sheet metal, the marginal portions being bent outwardly to form supporting flanges for the lining.

GIUSEPPE GALLO.
GIOVANNI BATTISTA BASSI.
FELICE BASSI.
LUIGI BASSI.
GIUSEPPE CALLIERA.